(12) United States Patent
Kobayashi (10) Patent No.: US 9,905,169 B2
(45) Date of Patent: Feb. 27, 2018

(54) DISPLAY DEVICE

(71) Applicant: Sakai Display Products Corporation, Sakai-shi, Osaka (JP)

(72) Inventor: Ryota Kobayashi, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days.

(21) Appl. No.: 15/022,761

(22) PCT Filed: Sep. 22, 2014

(86) PCT No.: PCT/JP2014/075113
§ 371 (c)(1),
(2) Date: Mar. 17, 2016

(87) PCT Pub. No.: WO2015/046158
PCT Pub. Date: Apr. 2, 2015

(65) Prior Publication Data
US 2016/0225324 A1 Aug. 4, 2016

(30) Foreign Application Priority Data

Sep. 24, 2013 (JP) .................................. 2013-197149

(51) Int. Cl.
*G09G 3/34* (2006.01)
*G02F 1/1333* (2006.01)
(Continued)

(52) U.S. Cl.
CPC ......... *G09G 3/3406* (2013.01); *G02B 6/0088* (2013.01); *G02F 1/133308* (2013.01);
(Continued)

(58) Field of Classification Search
None
See application file for complete search history.

(56) References Cited

U.S. PATENT DOCUMENTS

2008/0227308 A1* 9/2008 Fujii ..................... G06F 3/0416
439/66
2009/0283762 A1* 11/2009 Kimura ............... H01L 27/1225
257/43
(Continued)

FOREIGN PATENT DOCUMENTS

JP H7-191311 A 7/1995
JP 2008-084631 A 4/2008
(Continued)

*Primary Examiner* — Alexander Eisen
*Assistant Examiner* — Kebede Teshome
(74) *Attorney, Agent, or Firm* — Rudy J. Ng; Bret E. Field; Bozicevic, Field & Francis LLP (57) ABSTRACT

Provided is a display device capable of implementing a small size thereof by reducing a size of a frame and capable of implementing low cost. A source control circuit is formed integrally with a substrate being provided to a backlight frame and mounting a light-emitting diode. The substrate performs a function as a substrate for the light-emitting diode and a function as a substrate for the source control circuit. Since both functions are configured to be performed in one substrate, a frame area may be narrow, and a small-sized display device may be implemented.

7 Claims, 8 Drawing Sheets (51) Int. Cl.
   *G02F 1/1335*   (2006.01)
   *H04N 5/57*    (2006.01)
   *F21V 8/00*    (2006.01)
   *G09G 3/36*    (2006.01)
   *H04N 5/645*   (2006.01)

(52) U.S. Cl.
   CPC ......... *G02F 1/133603* (2013.01); *H04N 5/57* (2013.01); *G02B 6/0083* (2013.01); *G09G 3/3648* (2013.01); *G09G 2320/0626* (2013.01); *H04N 5/645* (2013.01)

(56) References Cited

U.S. PATENT DOCUMENTS

| | | | |
|---|---|---|---|
| 2010/0014315 A1* | 1/2010 | Fujimoto | G02B 6/001 362/615 |
| 2013/0002982 A1* | 1/2013 | Momose | G02B 6/0046 349/64 |
| 2015/0316811 A1* | 11/2015 | Uematsu | G02F 1/133308 349/58 |

FOREIGN PATENT DOCUMENTS

| | | |
|---|---|---|
| JP | 2012-033456 A | 2/2012 |
| JP | 5032199 B2 | 9/2012 |
| JP | 2013-142721 A | 7/2013 |

\* cited by examiner

DISPLAY DEVICE

CROSS-REFERENCE TO RELATED APPLICATIONS

This application is the national phase under 35 U.S.C. § 371 of PCT International Application No. PCT/JP2014/075113 which has an International filing date of Sep. 22, 2014 and designated the United States of America.

FIELD

The present invention relates to a display device of illuminating a display panel with light from a light source and displaying an image on the display panel under the control of a display control unit.

BACKGROUND

A display device is configured to include a display panel having a display plane displaying an image on the front surface thereof, a backlight unit having a light source to illuminate the display panel, and the like. The display panel using an active matrix driving method includes a thin-film substrate. A plurality of source lines are formed in one direction in the thin-film substrate, and a plurality of gate lines are formed in the direction perpendicular to the one direction in the thin-film substrate. The intersection areas of the source lines and the gate lines become unit pixels of which driving is controlled by thin-film transistors. A predetermined source signal is applied from a source driving unit to each source line, and a predetermined gate signal is applied from a gate driving unit to each gate line. By driving control of the source driving unit and the gate driving unit, a desired image is displayed on the display panel (for example, refer to Japanese Patent No. 5032199).

Until recent years, a cold cathode fluorescent lamp (CCFL) had been widely used as a light source. However, the cold cathode fluorescent lamp has problems in that a reflecting plate is necessarily provided and thickness and weight of the display device are increased. In addition, there is also a problem in that energy efficiency is low.

Therefore, in order to reduce the thickness and weight of the display device, a light-emitting diode (LED: laser emitting diode) is used as a light source.

SUMMARY

In the case of using a light-emitting diode as a light source, a substrate mounting the light-emitting diode needs to be provided.

Figure 8:
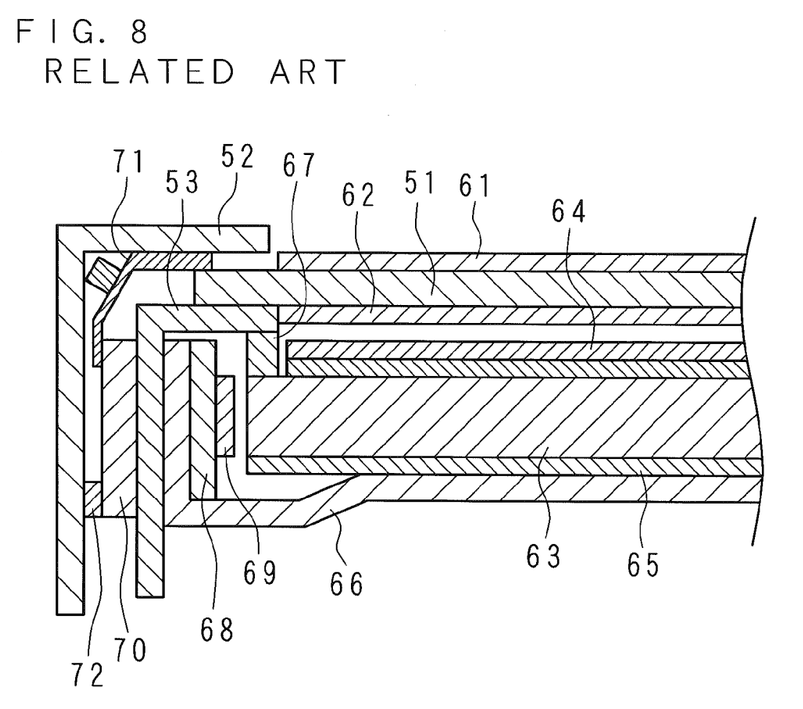
FIG. 8 is a cross-sectional diagram illustrating main components of a display device in the related art.

FIG. 8 is a cross-sectional diagram illustrating main components of a display device in the related art. A display panel 51 has respective polarizing plates 61 and 62 on the front and back surfaces. A light guide plate 63 is disposed at the back surface side (polarizing plate 62 side) of the display panel 51. An optical sheet 64 is formed on the front surface of the light guide plate 63, and a light-reflecting sheet 65 is formed on the back surface of the light guide plate 63.

A bezel 52 covers the front source of the side edge portion of the display panel 51, and a chassis 53 is provided so as to cover the back surface of the side edge portion of the display panel 51. On the other hand, a backlight frame 66 supporting the light guide plate 63 is provided at the back surface side of the light guide plate 63. In addition, a cushion material 67 is disposed between an end portion of the light guide plate 63 and the chassis 53.

The peripheral portion of the backlight frame 66 is an erected portion which is bent in an L shape. An outer surface of the erected portion is covered with the chassis 53. A light-emitting diode substrate 68 is provided on an inner surface of the erected portion, and a light-emitting diode 69 is mounted on the light-emitting diode substrate 68. A light-emitting diode connector (not shown) for inputting a driving voltage of the light-emitting diode 69 is provided inside an end portion of the display panel 51.

One end portion of a source driving unit 71 and one end portion of a gate driving unit (not shown) for driving each pixel are connected to an end portion of the display panel 51. A source substrate 70 is provided on an outer surface of the chassis 53. The other end portion of the source driving unit 71 is connected to one end of the source substrate 70, and a signal connector 72 for inputting an input signal to the display panel 51 is provided to the other end of the source substrate 70.

In the display device having the above-described configuration in the related art, since the source substrate 70 where the circuit for the source driving unit 71 is formed is provided in addition to the light-emitting diode substrate 68 mounting the light-emitting diode 69, a frame area is increased, so that there is a problem in that the size of the display device becomes large. In addition, since the substrates are separately provided, there is also a problem in that cost is increased.

In view of these problems, the present invention is to provide a display device capable of implementing a small size by reducing a size of a frame and implementing low cost by configuring a substrate for a light-emitting diode and a substrate for a source driving unit and/or a gate driving unit as a common substrate.

According to one embodiment of the present invention, there is provided a display device including: a display panel displaying an image; a light source emitting light with which the display panel is to be illuminated, and a display control unit controlling image display of the display panel, wherein the display control unit is formed integrally with a substrate mounting the light source.

In the display device according to the embodiment of the present invention, the display control unit controlling image display of the display panel is formed integrally with the substrate mounting the light source emitting light to be illuminated on the display panel. Therefore, in the embodiment, a function as a substrate for the light source and a function as a substrate for the display control unit are performed in one common substrate. In the embodiment, since one common substrate may be provided, a small-sized frame area is implemented, and cost is also reduced.

In the display device according to the embodiment of the present invention, it is preferred that a connector for inputting an input signal to the display control unit and a driving signal of the light source is provided in the substrate.

In the display device according to the preferred embodiment of the present invention, the connector for inputting the input signal to the display control unit and the driving signal of the light source is provided in the common substrate. Therefore, in the preferred embodiment, since the connector for input is also used commonly, the smaller-sized frame area can be implemented.

In the display device according to the embodiment of the present invention, it is preferred that the display device includes a light guide plate which allows light emitted from the light source to enter and allows the display panel to be illuminated with the entering light.

In the display device according to the preferred embodiment of the present invention, a small-sized display device using a horizontal type backlight where light emitted from the light source enters to the light guide plate and the display panel is illuminated with the entering light from the light guide plate can be implemented.

In the display device according to the embodiment of the present invention, it is preferred that the display device includes a chassis retaining the display panel, and a hole for inserting the display control unit is formed in the chassis.

In the display device according to the preferred embodiment of the present invention, the display control unit is inserted into the hole formed in the chassis retaining the display panel.

In the display device according to the embodiment of the present invention, it is preferred that the substrate has a horizontally-elongated T shape, and a plurality of the light sources are mounted on a horizontally-elongated portion of the substrate, and the connector is provided to a distal end portion of the substrate.

In the display device according to the preferred embodiment of the present invention, the plurality of the light sources are mounted on the horizontally-elongated portion of the T-shaped substrate, and the connector is provided to the distal end portion of the substrate.

In the display device according to the embodiment of the present invention, it is preferred that the display device includes a frame supporting the light guide plate, and a hole for inserting the distal end portion of the substrate is formed in the frame.

In the display device according to the preferred embodiment of the present invention, the distal end portion of the substrate is inserted into the hole formed in the frame supporting the light guide plate.

In the display device according to the embodiment of the present invention, it is preferred that the light source is provided under the display panel, a frame supporting the substrate is included, and a hole for inserting the display control unit is formed in the frame.

In the display device according to the preferred embodiment of the present invention, the display control unit is inserted into the hole formed in the frame supporting the substrate mounting the light source provided under the display panel. In the preferred embodiment, a small-sized display device using a direct type backlight where the display panel is illuminated directly with light from a lower light source can be implemented.

In the display device according to the embodiment of the present invention, it is preferred that an image is configured to be displayed on the display panel in an active matrix driving method, and the display control unit is a source control circuit or a gate control circuit.

In the display device according to the preferred embodiment of the present invention, the function as a substrate for the light source and the function as a substrate for the source control circuit or gate control circuit are performed in one common substrate. Therefore, in the preferred embodiment, a small-sized display device in an active matrix driving method can be implemented.

According to one embodiment of the present invention, since the display control unit is formed integrally with the substrate mounting the light source, a substrate for the light source and a substrate for the display control unit can be implemented as a common substrate, and thus, one common substrate may be provided, so that a small size can be implemented by reducing a frame area and cost can be reduced.

The above and further objects and features will more fully be apparent from the following detailed description with accompanying drawings.

DETAILED DESCRIPTION

Figure 1:
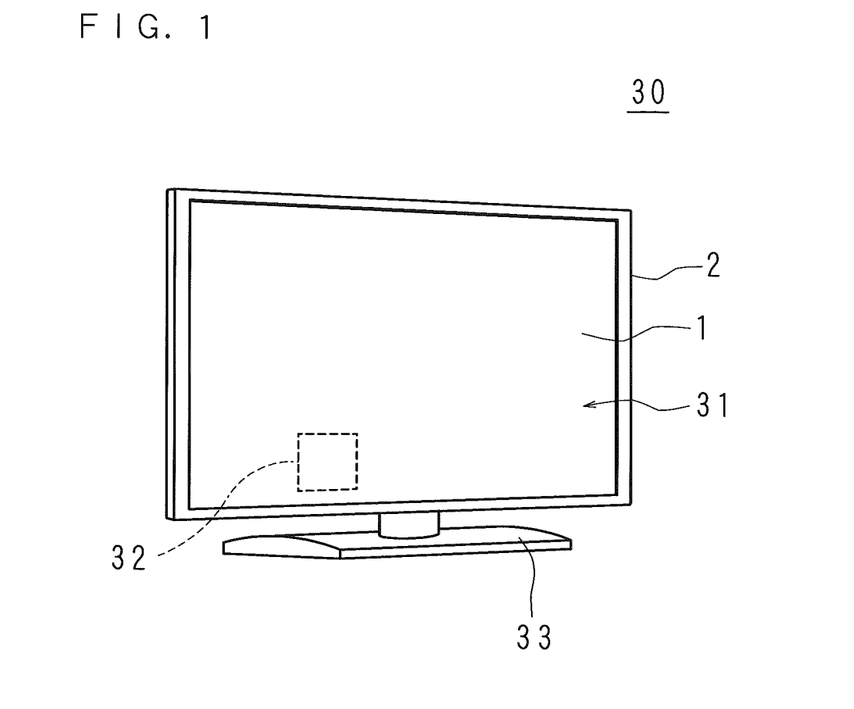
FIG. 1 is an outer appearance perspective diagram illustrating an example of a configuration of a television set.

Hereinafter, embodiments of the present invention will be described in detail with reference to the drawings. FIG. 1 is an outer appearance perspective diagram illustrating an example of a configuration of a television set. A television set 30 is configured to include a display device 31, a receiving unit 32 receiving a television signal, a stand 33, and the like. The display device 31 displays an image based on the television signal received by the receiving unit 32 by an active matrix driving method. In addition, the display device 31 is configured to include a display panel 1 which is a rectangular liquid crystal panel and has one surface as a display plane, a bezel 2 which covers a side edge portion of the display panel 1, and the like.

As described later, the side edge portion of the display panel 1 is retained by the bezel 2 positioned so as to cover one surface (front surface) side of the display panel 1 and a later-described chassis 3 positioned so as to cover the other surface (back surface) side of the display panel 1. That is, the side edge portion of the display panel 1 is interposed between the bezel 2 at the front surface (upper surface) side and the chassis 3 at the rear surface (lower surface) side, and the display panel 1 is retained.

First Embodiment

A first embodiment is an embodiment where a light source (light-emitting diode) and a display control unit (source control circuit) are installed at the same end surface side of a display panel and has a configuration where a function of a substrate for a light source and a function of a substrate for a display control unit are implemented on one common substrate. In addition, the illumination method employs a horizontal-type backlight using a light guide plate.

Figure 2:
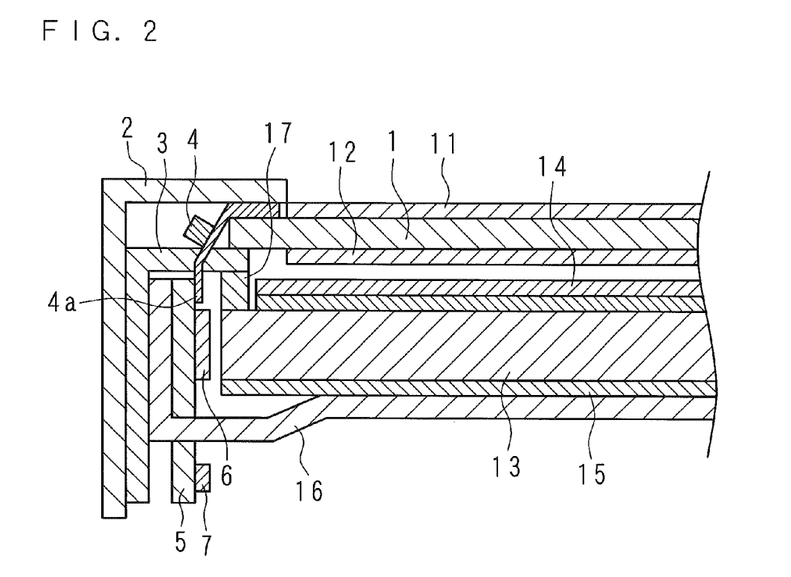
FIG. 2 is a cross-sectional diagram illustrating main components of a display device according to a first embodiment.
Figure 3:
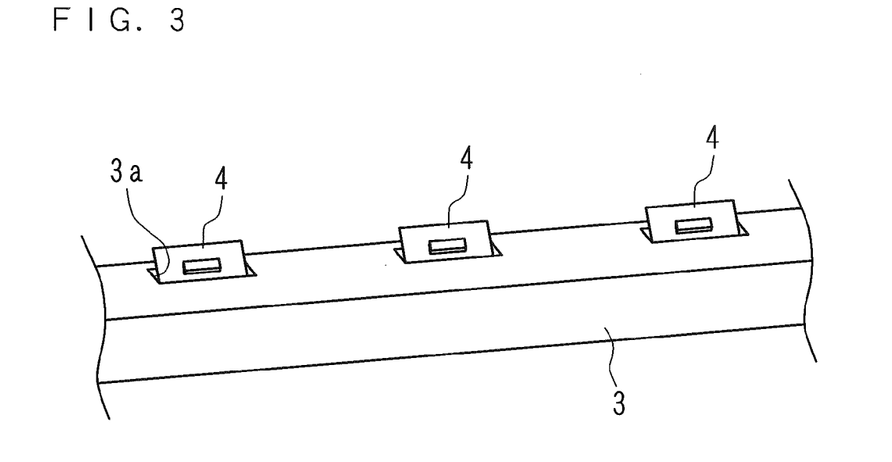
FIG. 3 is a perspective diagram illustrating a positional relationship between a chassis and a source driving unit.
Figure 4:
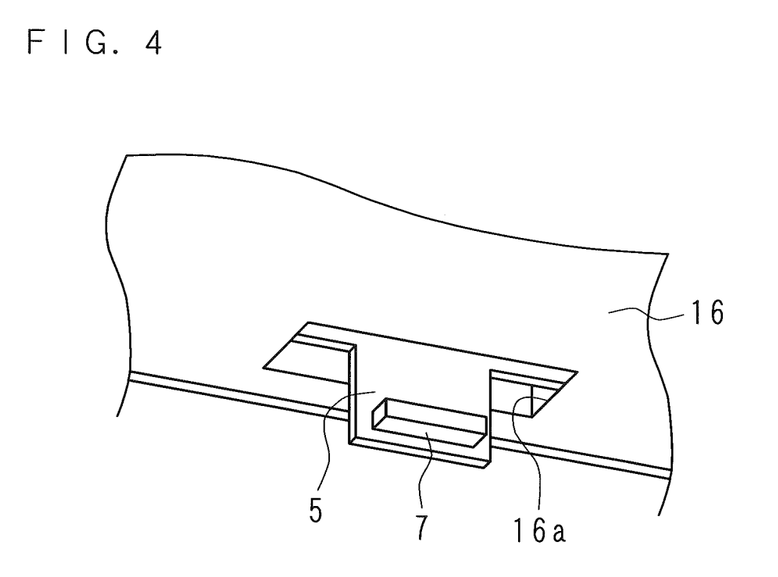
FIG. 4 is a perspective diagram illustrating a positional relationship between a substrate and a backlight frame.
Figure 5:
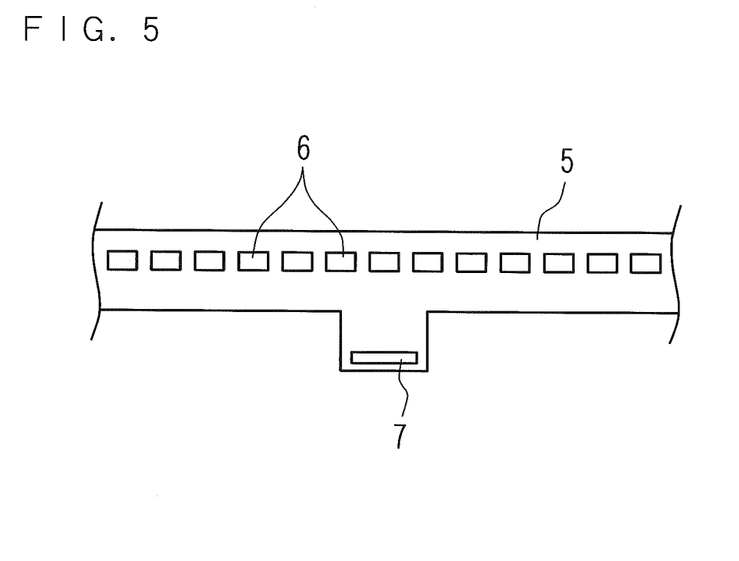
FIG. 5 is a plan diagram illustrating a configuration of the substrate.

FIG. 2 is a cross-sectional diagram illustrating main components of a display device according to the first embodiment. In addition, FIGS. 3, 4, and 5 are a perspective diagram illustrating a positional relationship between a chassis and a source driving unit, a perspective diagram illustrating a positional relationship between a substrate and a backlight frame, and a plan diagram illustrating a configuration of the substrate, respectively.

The display panel 1 is configured to include glass substrates on the one surface (front surface) and the other surface (rear surface), and a liquid crystal material is sealed between a pair of glass substrates. In addition, the display panel 1 is configured to include respective polarizing plates 11 and 12 on the front and back surfaces.

One end portion of a source driving unit 4 for driving each pixel is connected to an end portion of the display panel 1. The source driving unit 4 applies a predetermined source signal (source voltage) to each of source lines formed on the front surface of the display panel 1 according to an image signal to be displayed. In addition, a gate driving unit (not shown) for driving each pixel is connected to the other end portion of the display panel 1. The gate driving unit applies a predetermined gate signal (gate voltage) to each of gate lines formed on the front surface of the display panel 1 according to the image signal to be displayed. Due to the driving control of the source driving unit 4 and the gate driving unit, since transmittance determined based on electro-optical characteristics of the liquid crystal material can be changed, an amount of light transmitting the display panel 1 is controlled for each pixel, and thus, an image having a desired luminance gradation is displayed.

The bezel 2 is provided to cover the front surface of the side edge portion of the display panel 1, and the chassis 3 is provided to cover the back surface of the side edge portion of the display panel 1. In addition, the side edge portion of the display panel 1 is retained in a state that the side edge portion of the display panel 1 is interposed between the bezel 2 and the chassis 3.

A light guide plate 13 is disposed at the back surface side (polarizing plate 12 side) of the display panel 1. The light guide plate 13 is formed in a rectangular shape, and the horizontal and vertical dimensions thereof are substantially the same as those of the display panel 1. An optical sheet 14 is formed on the front surface (upper surface in FIG. 2) of the light guide plate 13, and a light-reflecting sheet 15 is formed on the back surface (lower surface in FIG. 2) of the light guide plate 13. The optical sheet 14 is formed in a rectangular shape of which size is slightly smaller than that of the display panel 1 and is formed as a configuration obtained by stacking one or plurality of optical sheets having a light diffusing function and optical sheets having a light condensing function. The light-reflecting sheet 15 is formed in a rectangular shape of which size is slightly larger than that of the light guide plate 13 and reflects the light emitted from the back surface of the light guide plate 13 to enter to the inside of the light guide plate 13 again.

A backlight frame 16 supporting the light guide plate 13 is provided at the back surface side of the light guide plate 13. The horizontal and vertical dimensions of the backlight frame 16 are substantially the same as those of the display panel 1, and the peripheral portion is an erected portion which is bent in an L shape. An outer surface of the erected portion is covered with the chassis 3, and the outer side of the chassis 3 is covered with the bezel 2. In addition, a cushion material 17 is disposed between an end portion of the light guide plate 13 and the chassis 3.

A flat rectangular substrate 5 is provided on an inner surface of the erected portion of the backlight frame 16. A light-emitting diode 6 as a light source is mounted on the substrate 5. Therefore, the substrate 5 has a function of mounting the light-emitting diode 6 and functions as a substrate for the light-emitting diode 6 (light source). The light emitting surface of the light-emitting diode 6 is disposed to face an end surface of the light guide plate 13. The light emitted from the light-emitting diode 6 enters to the end surface of the light guide plate 13, and the entering light is emitted from the front surface of the light guide plate 13 to be diffused and condensed by the optical sheet 14 and enters from the back surface of the display panel 1 to the inside of the display panel 1. Therefore, the display plane (front surface) of the display panel 1 becomes evenly bright.

In addition, a source control circuit 4a as a display control unit is formed integrally with the substrate 5 mounting the light-emitting diode 6. More specifically, in the substrate 5, a circuit for the source driving unit 4 is formed in a pattern, and electric parts for the source driving unit 4 are mounted. Therefore, the substrate 5 has a function as a circuit substrate for driving the source driving unit 4 and functions as a substrate for the source control circuit 4a (display control unit). A hole 3a for inserting a part of the source driving unit 4 is formed in the chassis 3 (refer to FIG. 3). The electric parts mounted on the substrate 5 are mainly chip resistors or condensers, and since the heights of these parts are lower than that of the light-emitting diode 6, although the electric parts may be provided on the substrate 5, no problem occurs.

In this manner, the substrate 5 performs a function as a substrate for the light-emitting diode 6 (light source) and a function as a substrate for the source control circuit 4a (display control unit). As illustrated in FIG. 8 described above, in comparison with the example of the related art where the light-emitting diode substrate 68 and the source substrate 70 are separately provided so as to perform the respective functions, in the first embodiment, since both functions are configured to be performed in one substrate 5, the size of the frame area can be reduced. As a result, a small-sized display device can be implemented.

In addition, a connector 7 for inputting a driving voltage of the light-emitting diode 6 from the outside and inputting an input signal (input voltage) to the display panel 1 from the outside is provided to the substrate 5. In the first embodiment, in one connector, the function of inputting two types of voltages is performed. Therefore, in comparison with the example of the related art where the light-emitting diode connector and the signal connector 72 are separately provided, in the first embodiment, the size of the frame area is further reduced, and a smaller-sized display device can also be implemented.

An opening hole 16a for inserting a part of the substrate 5 is formed in the backlight frame 16 (refer to FIG. 4). The substrate 5 has a horizontally-elongated T shape, a plurality of the light-emitting diodes 6 are arranged in the horizontally-elongated portion at an equal pitch, and a connector 7 is provided to the distal end portion (refer to FIG. 5). The substrate 5 is inserted into the opening hole 16a of the backlight frame 16 so that only the distal end portion provided with the connector 7 is exposed, and the substrate 5 can be extracted from the lower central portion of a liquid crystal module, so that the substrate 5 can be allowed to be connected to an external voltage source (refer to FIG. 4). In addition, an outlet of the connector 7 may be other than the lower central portion of the liquid crystal module.

Second Embodiment

A second embodiment is an embodiment where a light source (light-emitting diode) and a display control unit (gate control circuit) are provided at the same end surface side of the display panel, and in the configuration, a function as a substrate for a light source and a function as a substrate for a display control unit are implemented in one common substrate. In addition, an illumination method employs a horizontal type backlight using a light guide plate.

Figure 6:
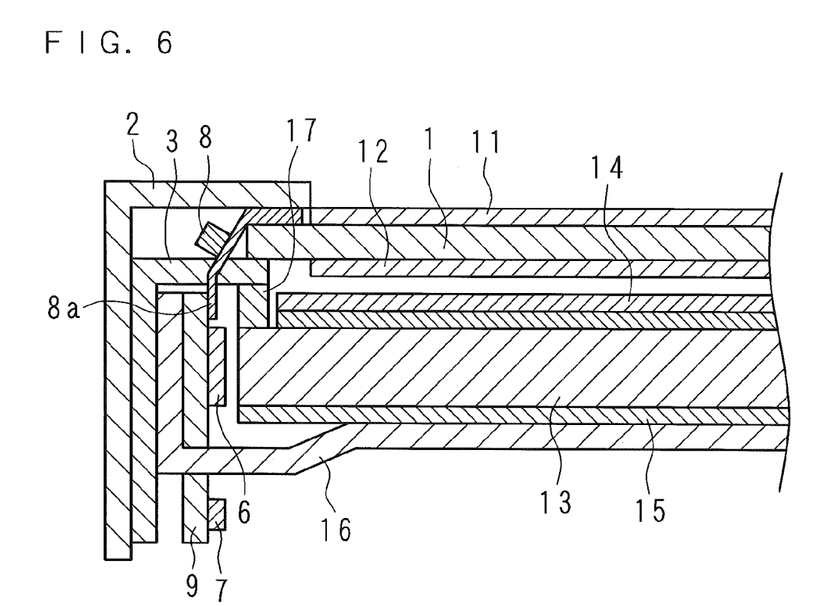
FIG. 6 is a cross-sectional diagram illustrating main components of a display device according to a second embodiment.

FIG. 6 is a cross-sectional diagram illustrating main components of a display device according to the second embodiment. In FIG. 6 (second embodiment), the same components as those of FIG. 2 (first embodiment) are denoted by the same reference numerals, and the detail description thereof is omitted.

A flat rectangular substrate 9 is provided on an inner surface of the erected portion of the backlight frame 16, and a light-emitting diode 6 is mounted on the substrate 9. Therefore, the substrate 9 has a function of mounting the light-emitting diode 6 and functions as a substrate for the light-emitting diode 6 (light source).

One end portion of the gate driving unit 8 for driving each pixel is connected to an end portion of the display panel 1. In addition, a gate control circuit 8a is formed integrally with the substrate 9 mounting the light-emitting diode 6. More specifically, in the substrate 9, a circuit for the gate driving unit 8 is formed in a pattern, and electric parts for the gate driving unit 8 are mounted. Therefore, the substrate 9 has a function as a circuit substrate for driving the gate driving unit 8 and functions as a substrate for the gate control circuit 8a (display control unit). The electric parts mounted on the substrate 9 are mainly chip resistors or condensers, and since the heights of these parts are lower than that of the light-emitting diode 6, although the electric parts may be provided on the substrate 9, no problem occurs.

In this manner, the substrate 9 performs a function as a substrate for the light-emitting diode 6 (light source) and a function as a substrate for the gate control circuit 8a (display control unit). In the related art, the substrate for the light-emitting diode and the substrate for the gate driving unit are separately provided. In comparison with the example of the related art having the above-described configuration, in the second embodiment, since both functions are configured to be performed in one substrate 9, the size of the frame area can be reduced. As a result, a small-sized display device can also be implemented.

In addition, a connector 7 for inputting a driving voltage of the light-emitting diode 6 from the outside and inputting an input signal (input voltage) to the display panel 1 from the outside is provided to the substrate 9. In the second embodiment, since the function of inputting two types of voltages is implemented in one connector 7, in comparison with the example of the related art where the light-emitting diode connector and the signal connector 72 are separately provided, the size of the frame area can be further reduced, and a smaller-sized display device can also be implemented.

Third Embodiment

In a third embodiment, an illumination method employs a direct type backlight where a light source (light-emitting diode) is disposed directly under a display panel without use of a light guide plate, and in the configuration, a function as a substrate for a light source (light-emitting diode) and a function as a substrate for a display control unit (source control circuit) are implemented in one common substrate.

Figure 7:
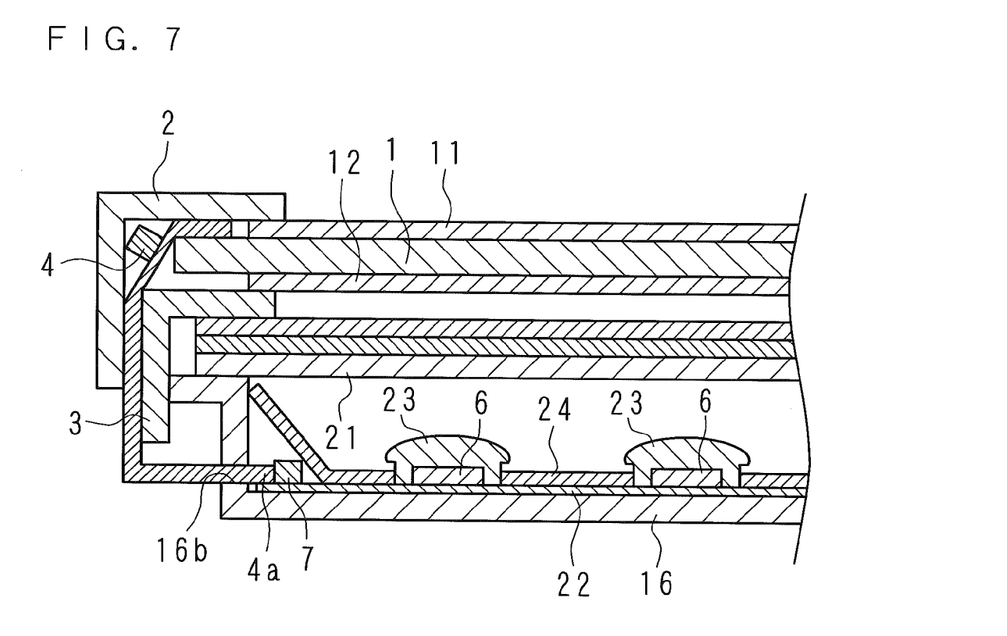
FIG. 7 is a cross-sectional diagram illustrating main components of a display device according to a third embodiment.

FIG. 7 is a cross-sectional diagram illustrating main components of a display device according to the third embodiment. In FIG. 7 (third embodiment), the same components as those of FIG. 2 (first embodiment) are denoted by the same reference numerals, and the detail description thereof is omitted.

A diffusing plate 21 is disposed at the back surface side (polarizing plate 12 side) of the display panel 1. The diffusing plate 21 is formed in a rectangular shape, and the horizontal and vertical dimensions thereof are substantially the same as those of the display panel 1. A backlight frame 16 supporting the diffusing plate 21 is provided at the lower side of the diffusing plate 21.

A flat rectangular substrate 22 is provided on the upper surface (surface of the side facing the diffusing plate 21) of the backlight frame 16. A light-emitting diode 6 as a light source is mounted on the substrate 22. A lens 23 is provided on a light-emitting surface of the light-emitting diode 6. A light-reflecting sheet 24 is formed on the upper surface of the backlight frame 16 of an area where the light-emitting diode 6 is not mounted. The substrate 22 has a function of mounting the light-emitting diode 6 and functions as a substrate for the light-emitting diode 6 (light source). The light emitted from the light-emitting diode 6 enters to the diffusing plate 21 through the lens 23 to be diffused and enters to an inside of the display panel 1 from the back surface of the display panel 1. A part of the light reflected on the diffusing plate 21 is reflected again on the light-reflecting sheet 24 to enter to the diffusing plate 21. Therefore, the display plane (front surface) of the display panel 1 becomes evenly bright.

One end portion of the source driving unit 4 for driving each pixel is connected to an end portion of the display panel 1. In addition, a source control circuit 4a as a display control unit is formed integrally with the substrate 22 mounting the light-emitting diode 6. More specifically, in the substrate 22, a circuit for the source driving unit 4 is formed in a pattern, and electric parts for the source driving unit 4 are mounted. Therefore, the substrate 22 has a function as a circuit substrate for driving the source driving unit 4 and functions as a substrate for the source control circuit 4a (display control unit). An opening hole 16b for inserting the other end portion of the source driving unit 4 is formed in the backlight frame 16.

In this manner, the substrate 22 performs a function as a substrate for the light-emitting diode 6 (light source) and a function as a substrate for the source control circuit 4a (display control unit). In the related art, the substrate (light-emitting diode substrate 68) for the light-emitting diode and the substrate (source substrate 70) for the source driving unit are separately provided. In comparison with the example of the related art having the above-described configuration, in the third embodiment, since both functions are configured to be performed in one substrate 22, the size of the frame area can be reduced. As a result, a small-sized display device can also be implemented.

Fourth Embodiment

In a fourth embodiment, an illumination method employs a direct type backlight where a light source (light-emitting diode) is disposed directly under a display panel without use of a light guide plate, and in the configuration, a function as a substrate for a light source (light-emitting diode) and a function as a substrate for a display control unit (gate control circuit) are implemented in one common substrate. In addition, since the configuration of the fourth embodiment is analogous to the above-described configurations of the first to third embodiments, the description thereof is omitted.

In this configuration, similarly to the above-described first to third embodiments, in comparison with the example of the related art, since the number of substrates and the number of connectors can be reduced, the size of the frame area can be reduced and, thus, a small-sized display device can be implemented, and low cost can be implemented.

Fifth Embodiment

A fifth embodiment is an embodiment where a source substrate and a gate substrate are mounted on a display panel, and a light source (light-emitting diode) and a display control unit (source control circuit and gate control circuit) are provided at the same end surface side of the display panel, and in the configuration, a function as a substrate for a light-emitting diode, a function as a substrate for a source control circuit, and a function as a substrate for a gate control circuit are implemented in one common substrate. An illumination method may be any one of a horizontal type backlight or a direct type backlight. In addition, since the configuration of the fifth embodiment is analogous to the above-described configurations of the first to third embodiments, the description thereof is omitted.

In this configuration, similarly to the above-described first to third embodiments, in comparison with the example of the related art, since the number of substrates and the number of connectors can be reduced, the size of the frame area can be reduced and, thus, a small-sized display device can be implemented, and low cost can be implemented.

In addition, although the configuration where the chassis 3 is provided is described in the above-described embodiments, in the case of a small model, since bending of the display panel 1 is small, the configuration where the chassis 3 is not provided may be employed.

In addition, although the configuration where an image is displayed in an active matrix driving method is described in the above-described embodiments, the prevent invention can be applied to a display device of displaying an image in a simple matrix method. In this case, a function as a substrate for a light source (light-emitting diode) and a function as a substrate for a display control unit (data control circuit, address control circuit) are implemented in one common substrate.

In addition, although the light-emitting diode is used as a light source, the present invention is not limited to the light-emitting diode, but other light sources may be employed.

In addition, although the gate control circuit and the source control circuit are formed in the substrate for mounting the light-emitting diode in the above-described embodiments, the entire configuration of the gate driving unit and/or the source driving unit may be provided in the substrate for mounting the light-emitting diode.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A display device, comprising:
a display panel displaying an image on a front surface of the display panel;
a light guide plate allowing light entering from a side surface of the light guide plate to be emitted toward the display panel from a main surface facing a back surface of the display panel;
a light source emitting light toward the side surface of the light guide plate;
a substrate at which the light source mounted on a front surface of the substrate is disposed so as to face the side surface of the light guide plate;
a display control unit, which has a control circuit controlling image display of the display panel, is formed integrally with the substrate, and extends from one end portion of the substrate to a periphery of the front surface of the display panel; and
a chassis which extends on the outside of the one end portion of the substrate and in a thickness direction of the substrate, and retains the display panel at a periphery of the back surface of the display panel,
wherein the display control unit and the chassis cross each other, and
a first hole for inserting the display control unit is formed in the chassis.

2. The display device according to claim 1,
wherein a connector for inputting an input signal to the display control unit and a driving signal of the light source is provided in the substrate.

3. The display device according to claim 2,
wherein the substrate has a T shape in which a protrusive portion is provided at a center of the other end portion opposite to the one end portion, and the connector is provided to the protrusive portion of the substrate.

4. The display device according to claim 3, further comprising
a frame which supports a surface of the light guide plate opposite to the main surface, and extends to a back surface of the substrate,
wherein the protrusive portion of the substrate and the frame cross each other, and
a second hole for inserting the protrusive portion of the substrate is formed in the frame.

5. The display device according to claim 1,
wherein an image is configured to be displayed on the display panel in an active matrix driving method, and the display control unit is a source control circuit or a gate control circuit.

6. The display device according to claim 1,
wherein the display control unit includes a plurality of units, and
a plurality of the first holes each of which inserts each of the plurality of units are formed in the chassis.

7. The display device according to claim 3,
wherein the substrate is formed in a rectangular shape whose longitudinal direction is a direction along the one end portion and the other end portion, and
a plurality of the light sources are mounted on the front surface of the substrate along the longitudinal direction of the substrate.

* * * * *